United States Patent [19]

Schlotzhauer

[11] Patent Number: 4,960,145
[45] Date of Patent: Oct. 2, 1990

[54] FUEL SHUT-OFF VALVE

[76] Inventor: Robert A. Schlotzhauer, 12907 Meadowlark, Lee's Summit, Mo. 64063

[21] Appl. No.: 343,042

[22] Filed: Apr. 25, 1989

[51] Int. Cl.$^5$ ............................................. F16K 17/36
[52] U.S. Cl. ...................................... 137/38; 180/282
[58] Field of Search ............................. 137/38, 39, 45; 180/282

[56] References Cited

U.S. PATENT DOCUMENTS

| 941,033 | 11/1909 | Pardee | 137/45 X |
| 3,807,423 | 4/1974 | Engel | 137/38 |
| 3,994,360 | 11/1976 | Leibold | 137/38 X |
| 4,799,505 | 1/1989 | Nowell | 137/38 |

FOREIGN PATENT DOCUMENTS 167577 10/1982 Japan ...................................... 137/38

Primary Examiner—Robert G. Nilson

[57] ABSTRACT

A valve for preventing the flow of fluid through a vehicle fuel delivery line after the vehicle experiences a sudden impact such as occasioned by a collision or other accident. An inertial member is operably coupled with a plug which is extendable to block a fluid passage in the valve. The inertial member is normally maintained in a seated position and prevents extension of the plug into the fluid passage. The inertial member is released from the seated position in response to a directional force of a predetermined magnitude. When the inertial member is released from the seated position, the plug is extended into the fluid passage by a spring to block fuel flow. The inertial member is non-responsive to a direction force exerted along at least one axis.

1 Claim, 2 Drawing Sheets

FUEL SHUT-OFF VALVE

BACKGROUND OF THE INVENTION

This invention relates in general to vehicle fuel systems and, more particularly, to a valve for blocking the flow of fuel from the vehicle fuel tank when the vehicle experiences a sudden directional impact.

A vehicle fuel system generally comprises a fuel tank for storing a quantity of fuel and delivery and return lines which extend between the vehicle engine and the tank. Fuel is delivered to the engine by a pump positioned in the delivery line at a location remote from the fuel tank. Although the fuel tank is generally well anchored by straps or other means to the vehicle undercarriage, a sudden impact to the vehicle may cause displacement of the tank and resulting separation of the delivery line from tank. Fuel may then freely leak from the tank and the combustible nature of the fuel presents a serious risk of fire or explosion. If a spark ignites the fuel, the entire vehicle may quickly become engulfed in flames. Often the vehicle occupants become trapped in the vehicle and serious injury or loss of life may occur if rescue personnel are unable to extricate the occupants before the fire has spread to the interior of the vehicle.

SUMMARY OF THE INVENTION

It is an object of this invention to provide in a vehicle fuel delivery system a valve which is automatically responsive to vehicle impacting forces which are capable of causing rupturing or separation of the fuel lines so that fuel flow is automatically shut off to prevent the resulting risk of fire or explosion.

As a corollary to the preceding objective, it is also an object of this invention to provide in a vehicle fuel delivery system a fuel shut-off valve which is non-responsive to normal bumps and jolts experienced by the vehicle such as when traveling along a rough road surface so that the valve does not inadvertently activate when the vehicle is not at risk of fuel leakage and resulting fire and explosion.

It is another object of this invention to provide a shut-off valve which is non-responsive to impact forces directionally oriented along at least one axis but which is responsive to impact forces of sufficient magnitude exerted along other axes and which is easily adjustable so that it is responsive to forces of greater or lesser magnitude.

To accomplish these and other related objects of the invention, a valve is provided with an internal fluid passageway and a moveable plug for closing off the passageway. An inertial member prevents entry of the plug into the passageway when the inertial member is in a seated position. The inertial member is responsive to directionally oriented impact forces of sufficient magnitude and is generally non-responsive to impact forces exerted along at least one axis. The inertial member is released from the seated position when an impact force overcomes the frictional forces holding the inertial member in the seated position. Resulting displacement of the inertial member permits extension of the plug into the passageway to block fluid flow. The valve may be used in a vehicle fuel delivery line to automatically prevent fuel flow if the vehicle is involved in an accident of sufficient severity to cause rupturing or severing the fuel lines.

BRIEF DESCRIPTION OF THE INVENTION

In the accompanying drawings in which like reference numerals are used to indicate like parts in the various views.

DESCRIPTION OF THE PREFERRED EMBODIMENT

Figure 1:
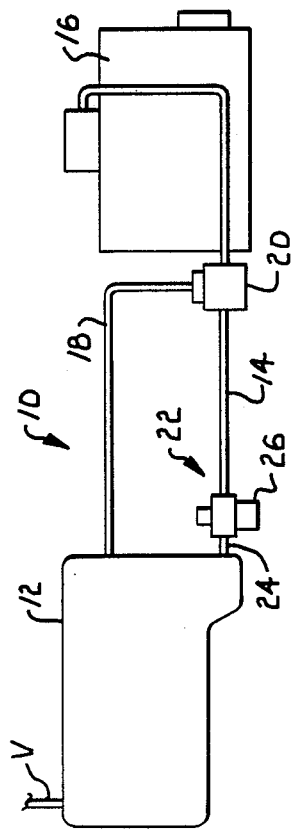
FIG. 1 is a side elevational view of a valve of the present invention positioned in a vehicle fuel system which is represented somewhat schematically.

Referring now more particularly to the drawings, and initially to FIG. 1, an automobile or other vehicle fuel system is represented generally by the numeral 10. Fuel system 10 comprises a fuel storage tank 12, a fuel delivery line 14 extending between the tank and an engine 16 which powers the vehicle, and a fuel return line 18 which extends between the engine and tank to return unused fuel to the tank. The fuel system also includes a fuel pump 20 which is positioned in the delivery line 13 to pump fuel from the tank 12 to the engine 16. Vent line V is shown as exiting from the upper left of fuel tank 12.

A valve 22 of the present invention is designed to automatically block fuel leakage from tank 12 under predetermined conditions. The valve 22 is connected at one end to the sump portion of the fuel tank 12 by a nipple 24. The other end of the valve is coupled to the fuel delivery line 14. The valve is hermetically sealed by a cover 26 to protect the internal components of the valve from dirt and other debris.

Figure 3:
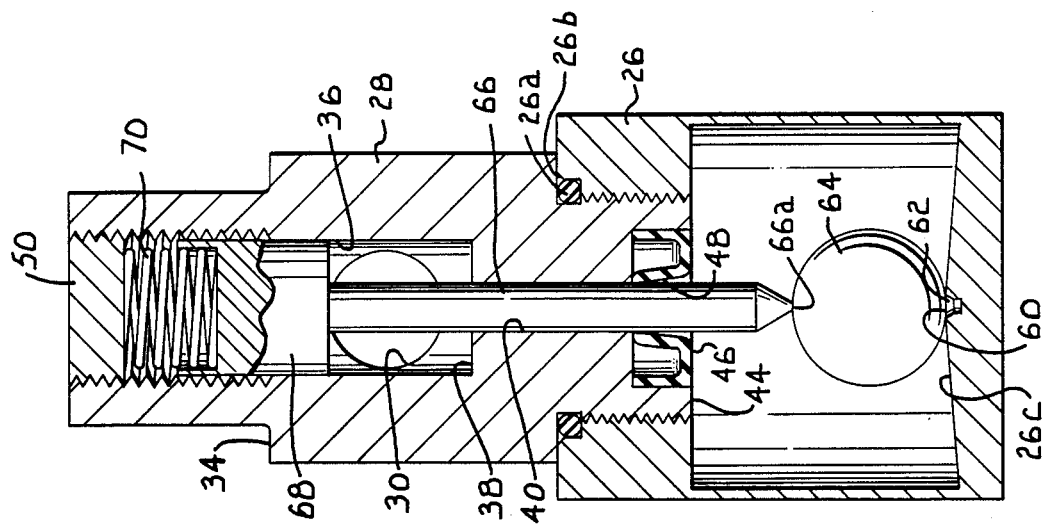
FIG. 3 is a vertical sectional view of the valve taken along line 3—3 of FIG. 2 and with the spherical inertial number in the seated position.
Figure 2:
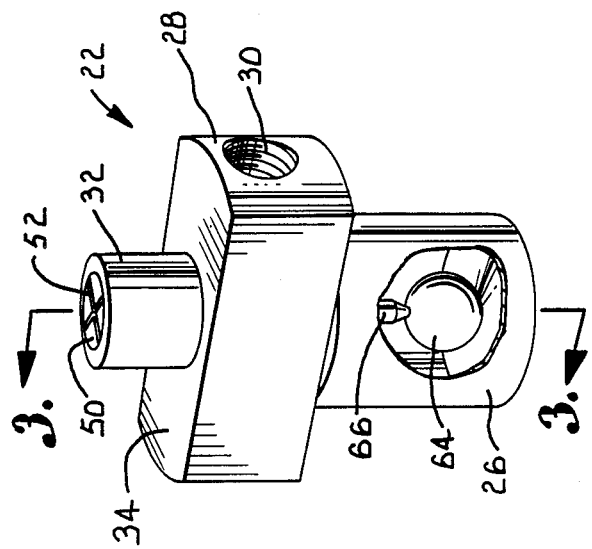
FIG. 2 is a side perspective view of the valve with a portion of its cover broken away illustrate details of construction.
Figure 5:
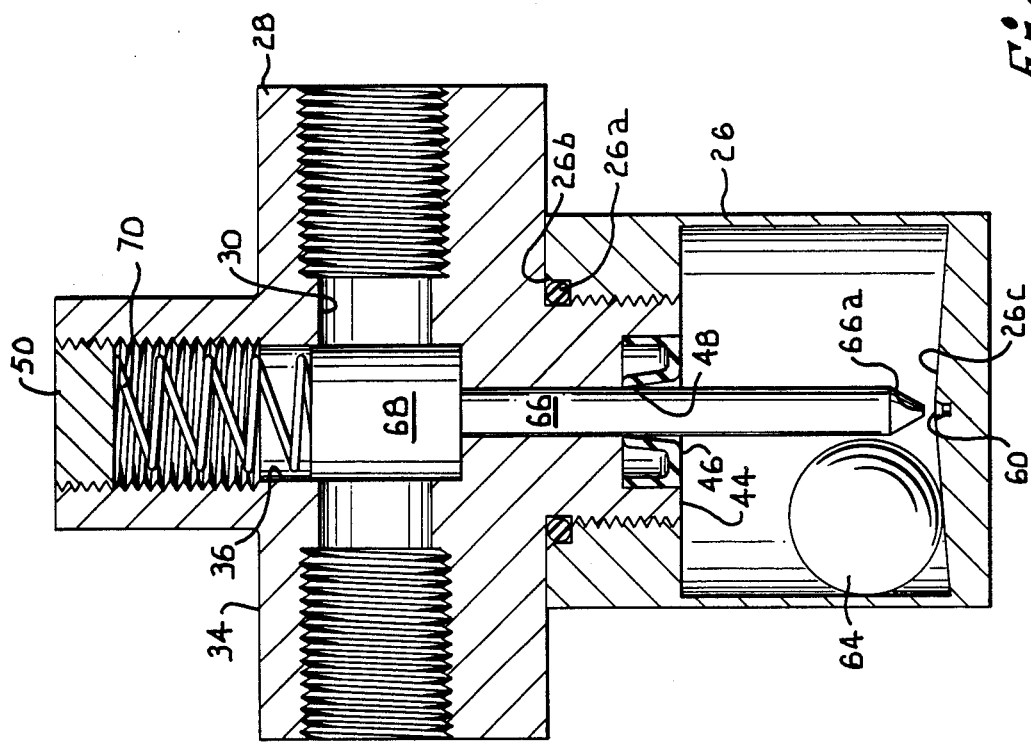
FIG. 5 is a vertical sectional view taken along line 5—5 in the direction of the arrows.
Figure 4:
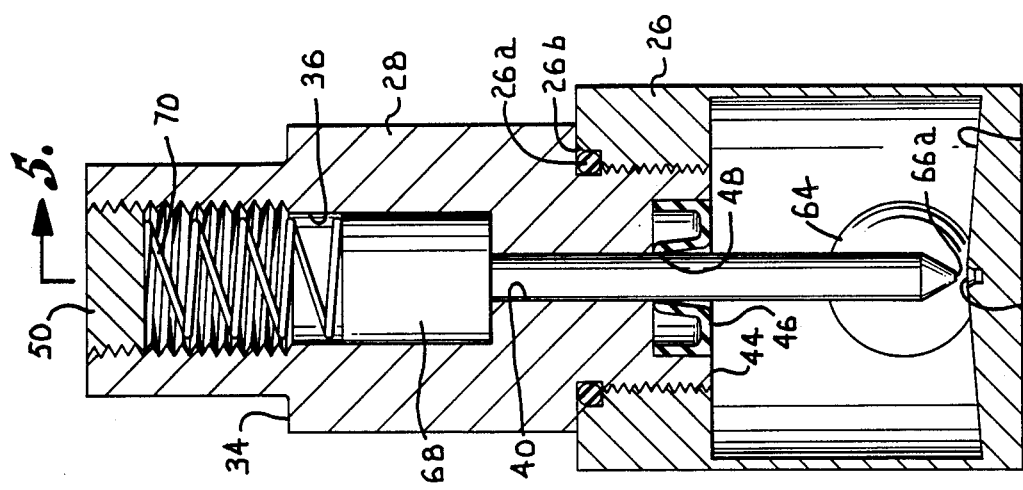
FIG. 4 is a vertical sectional view of the valve similar to that shown in FIG. 3 but with valve shown in an activated condition with the fluid passage blocked to prevent fluid flow.

Turning additionally to FIGS. 2-4, the valve 22 comprises an elongated body 28 having a central bore 30 which extends longitudinally through the body. The valve preferably comprises machine brass although other materials may be used. The bore is threaded at its ends to receive the externally threaded ends of the nipple 24 and delivery line 14. An upward extension 32 is positioned at a top surface 34 of body 28 and includes a vertical bore 36 which extends downwardly through extension 32 and into the body 28. Vertical bore 36 is oriented perpendicularly to and intersects longitudinal bore 30. The lower end of vertical bore 36 terminates in a wall 38 which includes a central aperture 40.

Central aperture 40 extends into a recess 42 which is formed in an externally threaded depending body extension 44 in alignment with vertical bore 36. A seal 46 is positioned in recess 42 and includes a central opening 48 aligned with aperture 40. The upper end of vertical bore 36 is threaded and is plugged by a removable, externally threaded cap 50. One or more slots 52 are formed in the top face of the cap to receive a screwdriver or other tool suitable for turning the cap.

Cover 26 threadably engages the depending body extension 44 in such a manner that may be drawn tightly against O-ring 26a that is located within the annular groove 26b thereby assisting in effecting the above mentioned hermetic seal for the valve structure. A seat 60 is provided on the upper surface of the lower end portion 26c of housing 26. This surface (26c) includes a central recessed portion 62 which is centrally located therein but with the surrounding surface being angled slightly downwardly therefrom.

A spherical inertial member 64 rests on seat 60 with the central recessed portion 62 providing a positive means of centering the member 64 on the seat. The inertial member may also be formed in other suitable shapes and preferably has a relative large mass. The diameter of inertial member 64 must be equal to or greater than the diameter of bore 30 for a reason to be subsequently described.

A stem 66 is connected at an upper end to a plug 68 which is housed in bore 36. The stem and plug are preferably formed from polished stainless steel to reduce corrosion. Other materials may also be utilized and should be selected in cooperation with the material chosen for the valve body so that electrolysis is minimized. The stem 66 extends through aperture 40 and seal opening 48 with the lower tapered end 66a of the stem engaging the inertial member. A compression spring 70 is positioned in bore 36 between the bottom surface of cap 50 and the upper face of plug 68 and exerts a downward biasing force on the plug 68. The above spring biased arrangement transmits the force to stem 66 which engages a top portion of the inertial member 64.

In operation, inertial member 64 is held in the seated position between the stem and the seat 60 by the biasing force exerted by the spring 70. When the inertial member is in place, plug 68 is maintained above longitudinal bore 30 to permit fluid passage through the bore. When the inertial member is displaced, it no longer prevents downward extension of the stem 66 and plug 68. The biasing force exerted by the spring 70 then forceably causes the plug 68 to extend downward and seat against the end wall 38 of bore 36. In this extended position, the plug completely blocks the passage of fluid through the longitudinal bore 30. In order to provide the plug with a path of travel of sufficient length to move from the retracted position to a position completely blocking the bore 30, the diameter of the inertial member must be at least as large as the bore diameter.

When installed, the valve is secured to fuel tank 12 by nipple 24 so that the axis which extends along stem 66 and through the inertial member 64 is oriented generally vertically. The vertical axis is thus generally perpendicular to the plane of travel of the vehicle. When the vehicle is subjected to an impact such as when the vehicle is involved in a collision, a resulting directional force is transmitted to the valve. If the force vector is oriented other than generally vertical and the resulting force exceeds a pre-selected value, the inertia of the inertial member 64 will overcome the frictional resistance which holds the member in the seated position. Once the inertial member is displaced, the compression spring 70 causes extension of plug 68 to block the passage of fuel through the valve and prevent fuel from flowing from the fuel tank 12 to cause a fire or explosion. The pre-selected value which the resulting force must exceed before causing activation of the valve is preferably set so that a minor collision does not activate the valve. Rather, the resulting force should activate the valve only when it is of a magnitude which might result in rupture or separation of the fuel lines. After the valve has been activated, it must be reset or replaced.

If vehicle experiences an impact which results in a generally vertical force vector being imparted to the valve, a much larger force is required to displace the inertial member because of the biasing force supplied by the compression spring 70. In tests, a vertical force in excess of 25 times the force of gravity failed to dislodge the inertial member. This general non-responsiveness to vertical forces prevents the valve from activating in response to normal road conditions such as potholes and the like.

The responsiveness of the valve may be varied by adjusting the frictional holding force on the inertial member 64 which the impact force must overcome. This can be readily accomplished by simply turning the cap to cause greater compression of spring 70. The holding force can also be varied by replacing the compression spring with one of greater or lesser strength. This adjustable responsiveness allows the same valve to be utilized in a variety of applications such as automobiles, school buses and tractor-trailer trucks.

It can thus be seen that the valve is automatically responsive to vehicle impacts such as would be experienced in a collision capable of rupturing the fuel lines. The automatic activation of the valve is an important feature of the invention as it does not require any action by the occupants of the vehicle in order to stop fuel flow through the delivery line. The valve 22, however, is generally non-responsive to bumps and jolts the vehicle is subjected to as it travels along a rough road surface. This prevents the valve from inadvertently activating in response to the vehicle encountering a pothole or curb.

It is contemplated that a spring biased or electric solanoid switch could be added to the valve to permit a vehicle operator to dislodge inertial member 64 in case of an emergency condition.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A valve in a vehicular fuel line for automatically closing the fuel line in the event of a collision, said valve comprising:

a valve body on the fuel line presenting a passage therein accommodating flow of fuel when open, said valve body being hermetically sealed to seal and shield internal components thereof;

a valve plug mounted within said valve body for linear movement from an open position wherein said passage is open and a closed position wherein said passage is closed and flow through the fuel line is blocked;

spring means for urging said plug toward the closed position;

a relatively massive ball in said valve body;

a rigid surface in said valve body presenting a seat on which the ball normally seats in a manner to resist unseating due to vertical forces but to allow unseating of the ball due to horizontally applied forces above a preselected magnitude indicative of a collision, said surface being oriented generally horizontally but sloping downwardly in all directions away from said seat to effect rolling of the ball away from the seat when unseated therefrom; and a stem extending from said valve plug and having a tip engaged against the ball when same is on said seat to maintain the plug in its open position, said stem releasing from the ball when same is unseated to then allow movement of the plug to its closed position under the influence of said spring means.

* * * * *